United States Patent

[11] 3,610,400

| | | |
|---|---|---|
| [72] | Inventor | Harvey Z. Burkholder<br>Ephreta, Pa. |
| [21] | Appl. No. | 863,893 |
| [22] | Filed | Oct. 6, 1969 |
| [45] | Patented | Oct. 5, 1971 |
| [73] | Assignee | U.S. Industries, Inc.<br>New York, N.Y. |

[54] EGG-PACKING MACHINE
12 Claims, 22 Drawing Figs.
[52] U.S. Cl. .................................................. 198/33 AA,
198/183, 198/37
[51] Int. Cl. ...................................................... B65g 47/24
[50] Field of Search ............................................ 198/33 R,
183; 88/14

[56] References Cited
UNITED STATES PATENTS
3,024,889  3/1962  Reading ........................ 198/33.1
3,091,323  5/1963  Niederer et al. ............... 198/183 X

*Primary Examiner*—Gerald M. Forlenza
*Assistant Examiner*—Jerold M. Forsberg
*Attorney*—Price, Heneveld, Huizenga & Cooper ABSTRACT: An improved egg-packing apparatus orienting eggs into columns and rows so that a carton can be packed by vacuum lifting the eggs positioned with the pointed end downward. To insure that each row is filled as it advances into the machine, a vacuum switch is actuated when vacuum builds up due to the closing of openings to the atmosphere by the presence of an egg on a spring-biased hinged platform positioned in each column adjacent to an accumulating table which is delivering the eggs to the apparatus. Also, a gate otherwise blocking the egg on the platform is cam-actuated out of the way when the filled row is advanced by engaging rollers. The eggs are oriented as they index through the column one row at a time, the rows being defined by the engaging rollers, by means of flexible fingers mounted on a separate endless chain, which fingers are cammed up into the plane of the rollers. Because the eggs have moved so that the pointed end is adjacent to the fences defining the columns due to the rotation of the engaging rollers by a rack, the fingers upend the eggs with the pointed ends down. This orientation is maintained by converging the fences defining the columns and by preventing tipping of the eggs by fingers projecting sideways and down between the engaging rollers, the fingers being in the form of a star rotatably mounted on the fences. As the rollers advance, the fingers each move into and out of position. Immediately before pickup, the eggs' orientation is maintained by the spacing of the fences to approximate the width of the eggs, this spacing including the use of horizontally extending wire loops which compress as the eggs pass through.

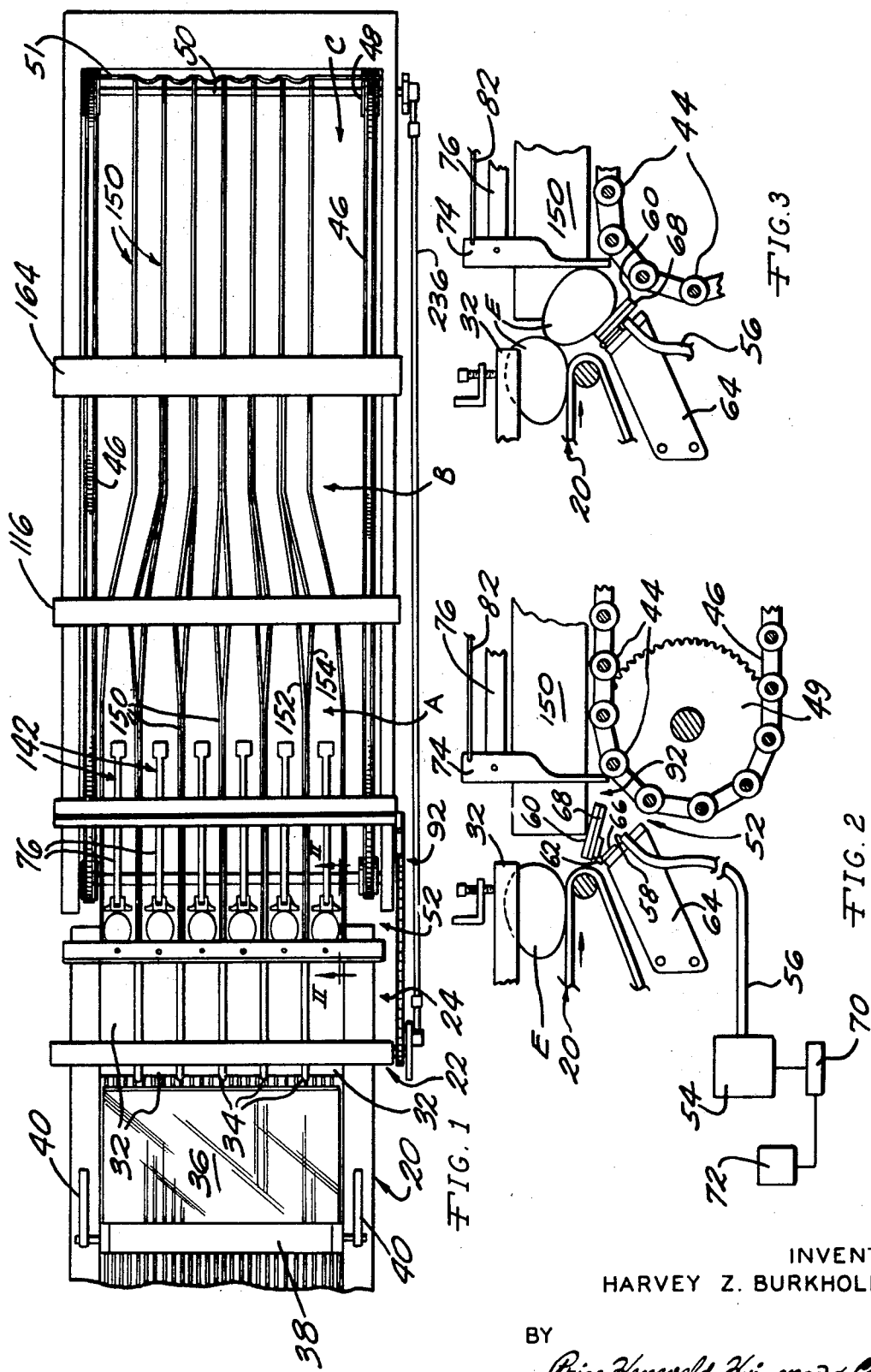

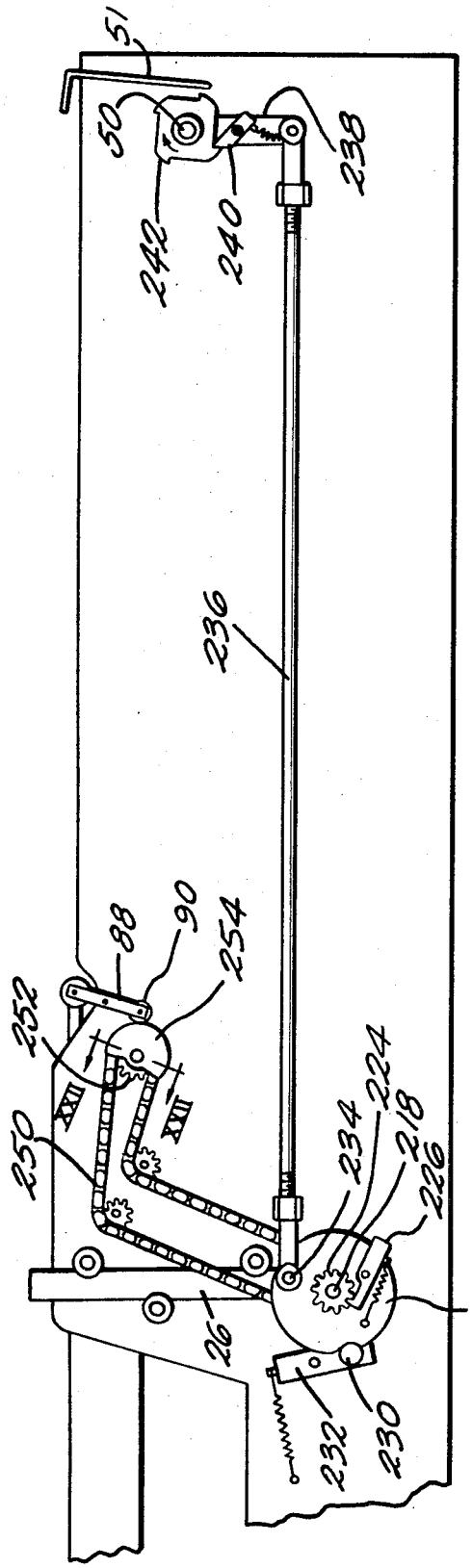
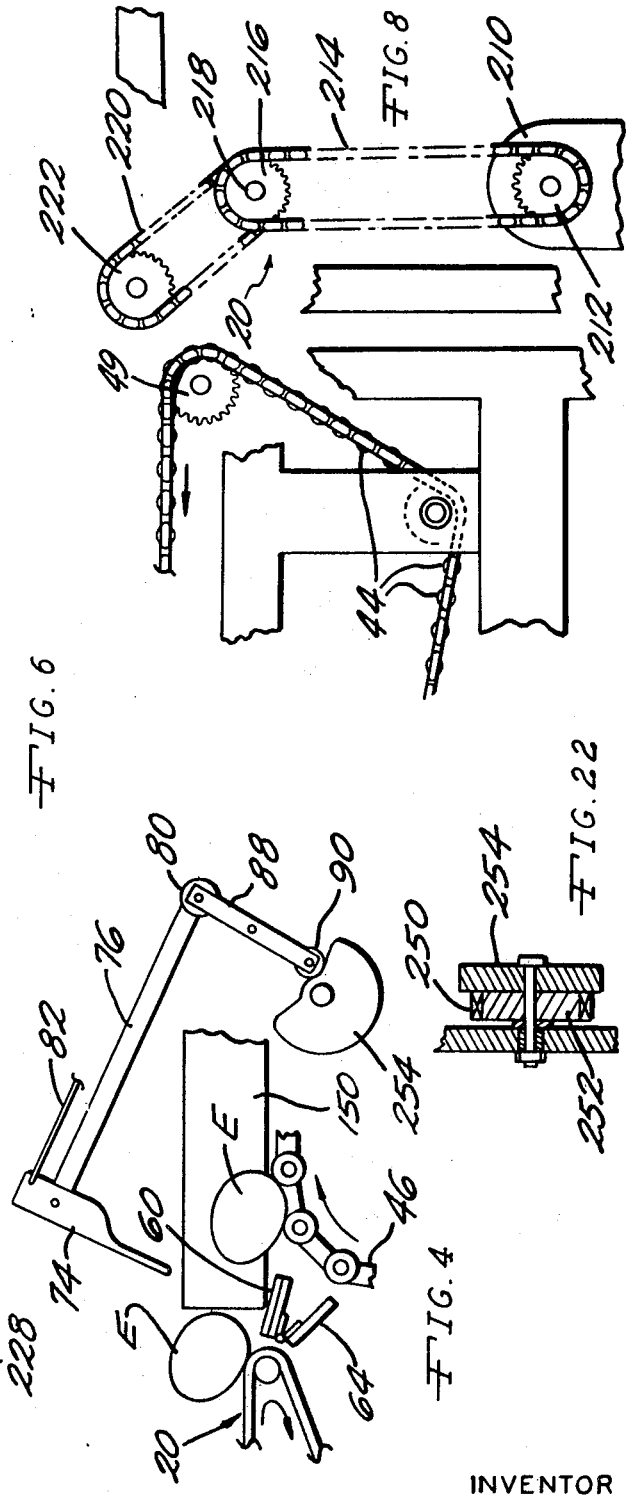

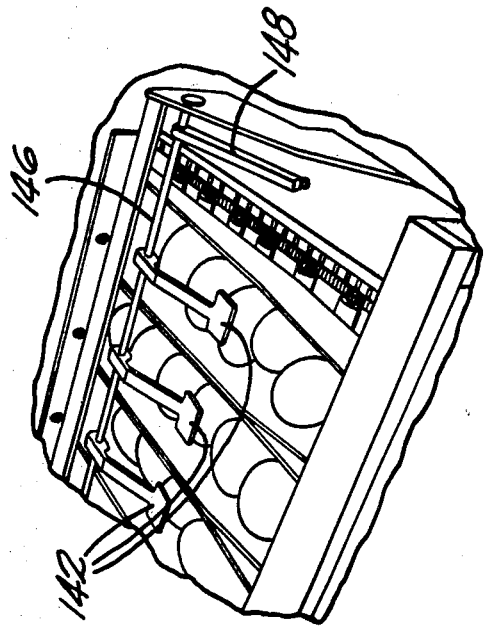
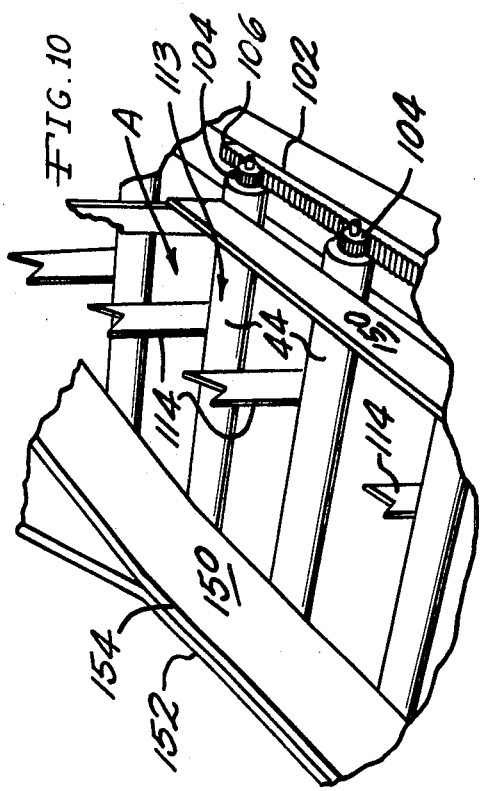
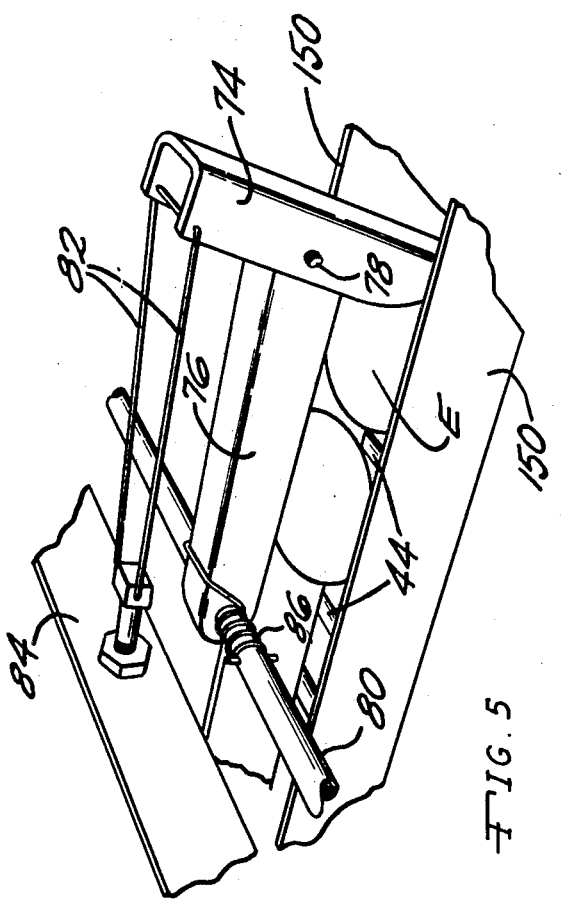
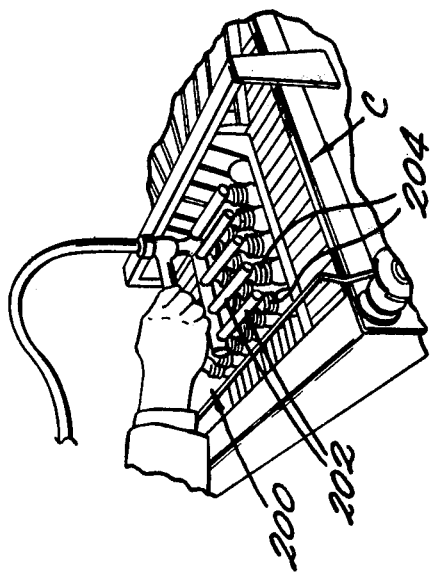
INVENTOR
HARVEY Z. BURKHOLDER

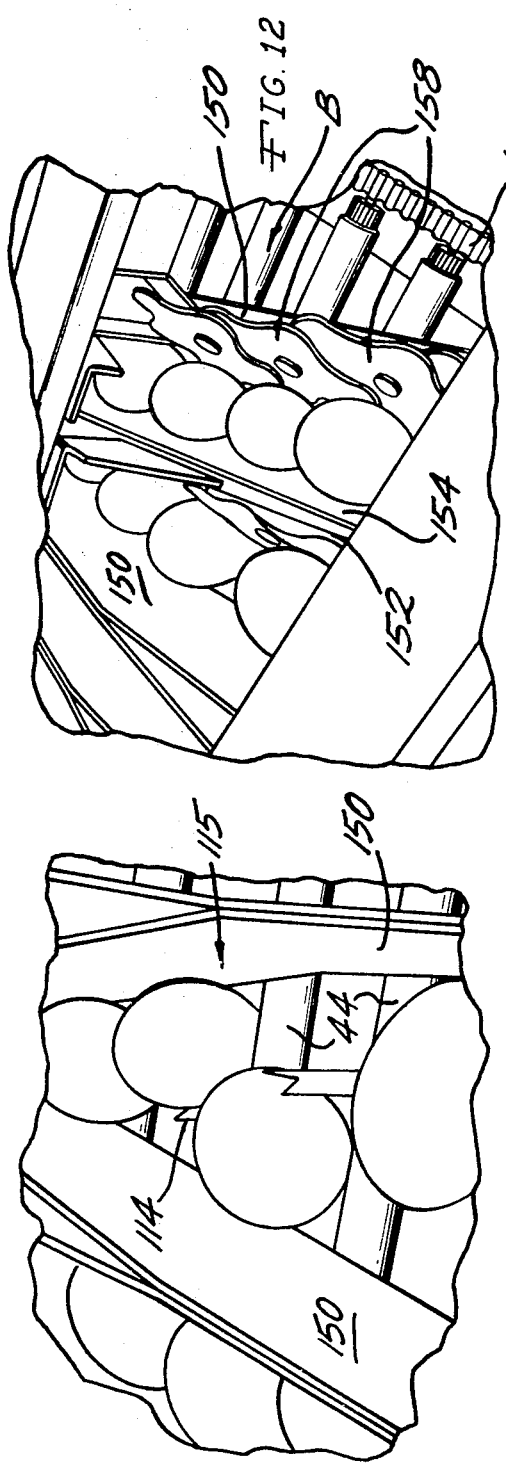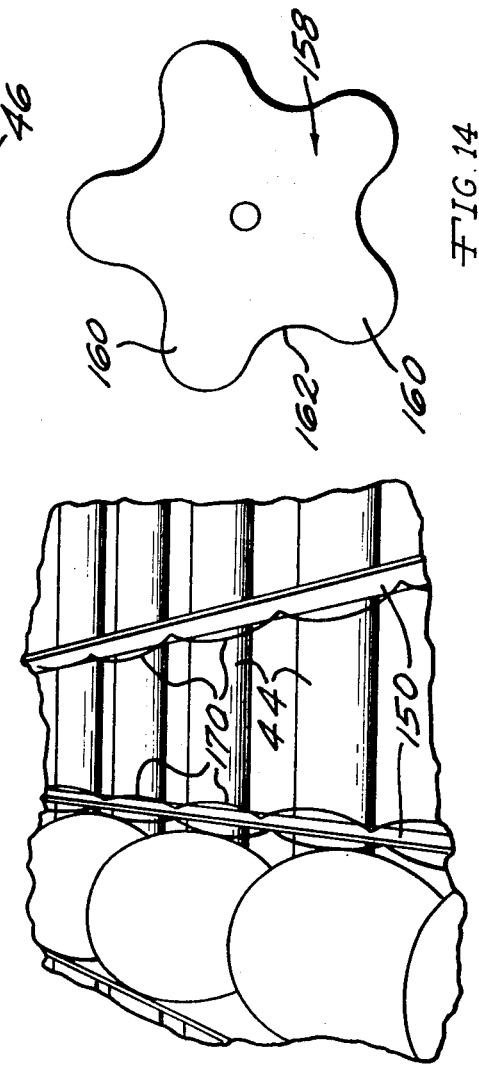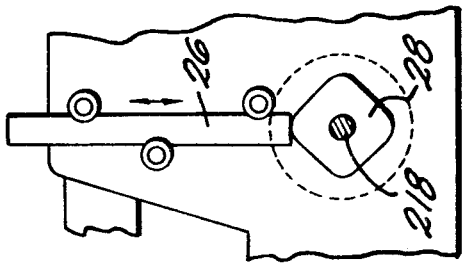

INVENTOR
HARVEY Z. BURKHOLDER

BY
Price, Heneveld, Huizenga + Cooper
ATTORNEYS 3,610,400

EGG-PACKING MACHINE

BACKGROUND OF THE INVENTION

A number of egg-packing machines have been constructed in the past for taking randomly oriented eggs and automatically arranging them and packing them in egg cartons after which the eggs are sold. One example of such a machine is disclosed in U.S. Pat. No. 3,311,216, the machine disclosing therein an accumulating table, means for forming columns of eggs at the exit end of the table, means for advancing the columns one row at a time, means for insuring that the advancing means are operative only when each row is filled, means for orienting the eggs in a prescribed position, and means for removing the eggs so oriented and placing them in an egg carton. The particular means disclosed for accomplishing these functions work satisfactorily but it has been found that in some instances improvements can be made. It is to these improvements that the instant application is directed. For example, the apparatus disclosed in the aforesaid patent utilizes a star wheel for controlling the advancement of the rows, the wheel being counterbalanced by a weight which, when the wheel has received an egg, is pivoted out of the way of a light beam. When all the weights are so pivoted, the beam is thereby allowed to activate a photocell. The activation of the photocell actuates the motor which indexes the rows forward. Such a system has a disadvantage in that it is difficult to arrange it so that the system will operate if less than all of the columns are being utilized to collect eggs. Thus, even though it is not desired that one of the columns have eggs therein because a shortened carton is being utilized, nevertheless the star wheel in that column, by means of the lack of an egg weighing it down, will continue to interrupt the light beam so as to prevent the machine from being activated.

Still another area of improvement concerns the orientation of the eggs for pickup and deposit in an egg carton. The orientation of eggs by machines such as those in U.S. Pat. No. 3,169,354 does not always insure that the pointed end will be delivered directed downward. Merely relying on gravity to turn an egg due to the slightly offset center of gravity has not proved to be sufficient.

SUMMARY OF THE INVENTION

This invention relates to an egg packing apparatus similar to that described above as disclosed in the aforesaid U.S. Pat. No. 3,311,216, the invention providing improvements in the areas of the means controlling the advance of the columns one row at a time and the means orienting the eggs within the rows to achieve a desired orientation.

Accordingly, it is an object of the invention to provide an improved egg-packing apparatus wherein the control of the advancing of the eggs row by row can be adjusted so as to accommodate fewer columns than there are actual spaces for.

It is a further object of the invention to provide an egg-packing apparatus of the above character wherein the orientation means is improved so as to insure that the egg will always be transferred with the pointed end downward.

It is a related object of the invention to provide an egg-packing apparatus of the above character wherein the improved orienting means accommodates eggs of different sizes.

Other objects and advantages will become apparent upon reference to the following drawings and detailed discussion.

BRIEF DESCRIPTION OF THE DRAWINGS

FIG. 1 is a fragmentary plan view with portions broken away of the apparatus constructed in accordance with the invention;

FIGS. 2 through 4 are partially schematic fragmentary side elevational views illustrating the stages through which the control means for the advancing means proceeds;

FIG. 5 is a perspective view of the gate utilized in the control of the advancing means;

FIG. 6 is a fragmentary side elevational view of the apparatus illustrated in FIG. 1;

FIG. 7 is a fragmentary side elevational view similar to FIG. 6 but illustrating only the drive train for the dejammer plow;

FIG. 8 is a fragmentary partially broken away side elevational view similar to that illustrated in FIG. 6 but taken from the opposite side;

FIG. 9 is a fragmentary perspective closeup view of a portion of the apparatus;

FIG. 10 is a fragmentary perspective view of a portion of the orienting means of the invention, the drive chain for the rollers having been omitted to show the rack;

FIG. 11 is identical to the view shown in FIG. 10 except that eggs have been fed into the column;

FIG. 12 is a fragmentary perspective view of the orienting means further downstream from FIG. 11;

FIG. 13 is a fragmentary perspective view of the orienting means even further downstream from FIG. 12;

FIG. 14 is a plan view of one of the star wheels of FIG. 12 utilized in conjunction with the orienting means;

FIG. 15 is a fragmentary perspective view of means for removing the oriented eggs from the apparatus;

FIG. 22 is a fragmentary sectional view taken along the line XXII—XXII of FIG. 6.

DESCRIPTION OF THE PREFERRED EMBODIMENT

Figure 17:
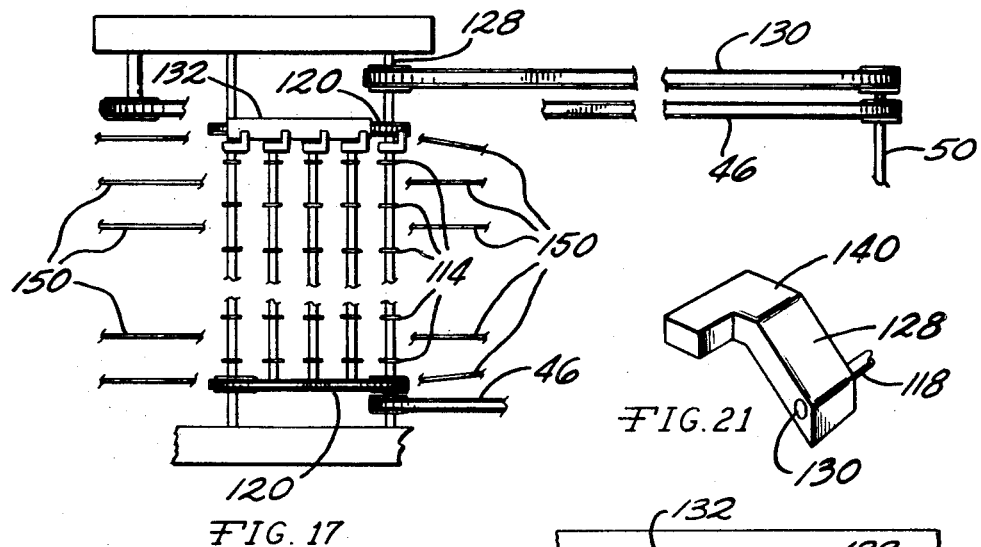
FIG. 17 is a fragmentary plan elevational view partially broken away illustrating the egg up-ending fingers utilized in another station (A)

The invention relates to an improvement of an egg-packing machine to which eggs are supplied by an accumulating table 20 which conventionally utilizes a dejammer plow 22 at the exit end 24 of the accumulating table, the plow being reciprocated up and down by means of a bar 26 which rides on a cam 28 driven by a drive shaft 218. Any one of a number of accumulating tables can be utilized, such as the table disclosed in the aforesaid U.S. Pat. No. 3,311,216 or the accumulating table disclosed in by copending application Ser. No. 860,193, filed Sept. 23, 1969, which application has a common assignee with the instant application. In case of the latter, a holddown cover 32 can be utilized in position with the dejammer plow to prevent buildup of eggs in the vertical direction within the dejammer plow. Because of the spaced ribs 34 forming the dejammer plow, the columns through which the eggs are to move are first formed at this point. To further prevent eggs from piling up behind the dejammer plow, a plexiglass sheet 36 is cantilevered from a pivot bar 38 which has an arm 40 resting on a microswitch, so that if the plexiglass sheet rises due to the buildup of eggs, the microswitch under the arm 40 is released, thereby turning off the accumulating table.

The remainder of the apparatus performs the following functions. Once formed in columns, the eggs are released from the accumulating table 20 to the remainder of the egg-packing apparatus one row at a time, the row being released only when all of the columns have an egg therein. The particular control for accomplishing this is discussed hereinafter. Thereafter each row of eggs is moved through the egg-packing machine a distance corresponding to a new row, as each new row is fed into the apparatus. The indexing of each row through the rest of the machine is accomplished by conventional rollers 44 which are rotatably mounted on chains 46 at both sides of the egg-packing apparatus. The chains 46 are driven by a sprocket 48 mounted on a drive shaft 50 at one end of the machine, which drive shaft is actuated by a drive train hereinafter discussed. The chain rides over idler sprockets 49 at the initiating end of the egg-packing machine. As the columns of eggs move through the rest of the egg-packing apparatus, the columns are maintained by fencing strips generally indicated by numerals 150, the strips gradually converging together from a station identified as "A" through an intermediate station identified as "B" and finally to the completely oriented station identified as "C." The particular structure of the fencing strips and the means for orienting the eggs within the columns formed by the fencing strips are hereinafter discussed. Once the eggs reach the station "C," the proper number of rows are lifted out by a vacuum lift head 200, which lift head can be automatically guided and controlled or it can be operated by hand as shown in FIG. 15. A stop bar 51 is activated when station C fills up, thus terminating the indexing mechanism.

CONTROL OF THE ADVANCING ROLLERS

In accordance with the invention, the apparatus incorporates an improved means for controlling the advancing of the eggs one row at a time through the columns formed by the strips 150 in the following manner. As indicated FIGS. 2 through 4, as the egg E leaves the accumulating table 20 and passes out from underneath the holddown cover 32, it falls into a controlling station 52 which utilizes a conventional source of vacuum 54 connected by a vacuum hose 56 to a point at an open tube end 58, the open tube end 58 subjecting the vacuum hose 56 to the atmosphere. There is an open tube end 58 in line with each column formed by the partitions 34. To close off the open tube end 58 from the atmosphere when an egg has entered the controlling station 52, a receiving means comprising a platform 60 is hingedly attached at 62 to a plate 64 mounted to the frame of the egg-packing apparatus. The platform 60 is biased away from the opening 58 of the vacuum hose by a spring 66 attached to the hinged point 62. To complete the closure of the open tube end 58 when the platform 60 is depressed by the weight of an egg against the action of the spring 66, a felt pad 68 is fixed to the bottom of the platform 60. As the felt pads close off the open ends 58, the vacuum drawn by the vacuum motor 54 increases to a point wherein an adjustable vacuum switch 70 is triggered, thereby actuating a solenoid 72 which in turn engages the drive train as hereinafter explained. Because the vacuum switch, which is conventional as is the solenoid 72, is adjustable, the switch can be set for varying degrees of vacuum depending upon how many columns are being utilized in the packing apparatus. Thus, if the apparatus has a total capacity for six columns, but the carton to be packed has only four columns, two of the columns can be blocked off at the dejammer plow entry, thereby reducing the effective number of columns to four. The vacuum switch 70 is simply adjusted to trigger when less vacuum is drawn, the lower vacuum being due to the fact that two of the lines will still be open to the atmosphere.

To prevent an egg on the platform 60 from prematurely sliding down into the space formed by two rollers 44 adjacent to the station 52 (FIG. 3), a gate 74 is mounted to depend downwardly between the two rollers creating the opening into which the egg is to be moved when the indexing occurs, the egg abutting the gate 74 prior to the indexing step. The gate (FIG. 5) is mounted by a lever 76 pivotally mounted at 78 to the gate at one end thereof, the other end being journaled to a rocker shaft 80 which rotates the lever 76 and therefore the gate 74 upwardly at the proper moment so as to allow the egg in the controlling station 52 to clear the gate and be indexed into the apparatus via the two rollers 44 (FIG. 4). The gate is maintained in an orientation slightly inclined from the vertical by guide wires 82 attached to a bar 84 (FIG. 5) mounted on the frame of the apparatus, the wires passing through holes in the top of the gate 74. The lever 76 and gate 74 are biased into the blocking or holdback position by a spring 86 wound around the rocker shaft 80 and over the top of the lever 76. The rocker shaft 80 is rocked through an arc, in response to the indication by the controlling station that indexing can take place, by a pivot arm 88 attached at one end to the rocker shaft 80, the other end of the arm 88 rotatably mounting a cam follower 90 which is operated by a cam in a manner hereinafter discussed.

ORIENTATION STATIONS-STATION "A"

In accordance with another aspect of the invention, after the eggs are indexed through the egg-packing apparatus one row at a time as dictated by the controlling station 52, the eggs are oriented so that the pointed end is down. The columns of eggs are maintained by the fencing strips 150 which, at the position 92 adjacent to the controlling station 52, are aligned with the partitions 34. To accomplish the orientation of the eggs with the pointed end down, the eggs are moved sideways between the strips 150 so that the pointed end of the eggs are immediately adjacent to one of the two strips forming that particular column, the width between the strips at this position 92 being considerably greater than the width of the egg. (See for example FIG. 11.) To accomplish this, the rollers 44 are rotated as they move from the position 92 and through most of the station A. Such rotation is accomplished by a rack 102 mounted on the frame adjacent and below the chain 46 and cooperating pinion gears 104 mounted on each end of each roller. Because an egg is lopsided, as it rotates it will tend to travel toward the direction to which the pointed end is extended, thereby insuring that the pointed end of the egg will be positioned adjacent to one of the two strips forming that particular column by the time the egg reaches the midpoint of station A. For that reason, the rack 102 terminates at the midpoint 106 of that station.

Figure 16:
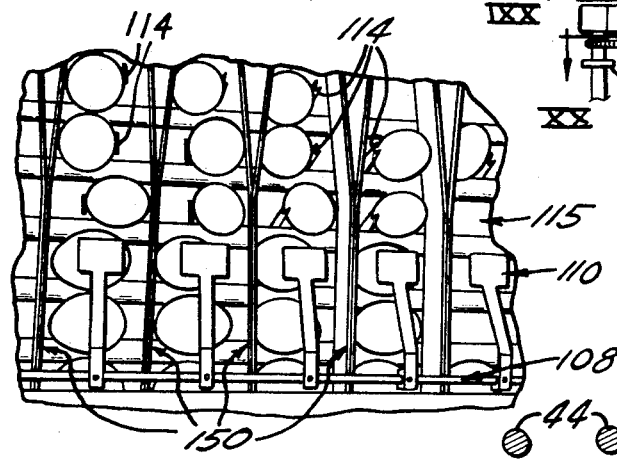
FIG. 16 is a fragmentary perspective view of one station (B), taken from above.
Figure 20:
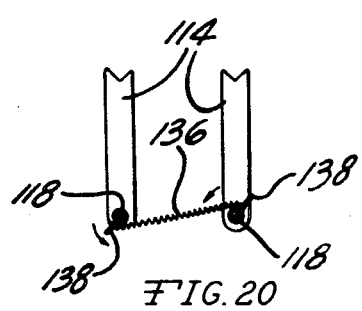
FIG. 20 is a sectional view taken along the line XX—XX of FIG. 18.
Figure 19:
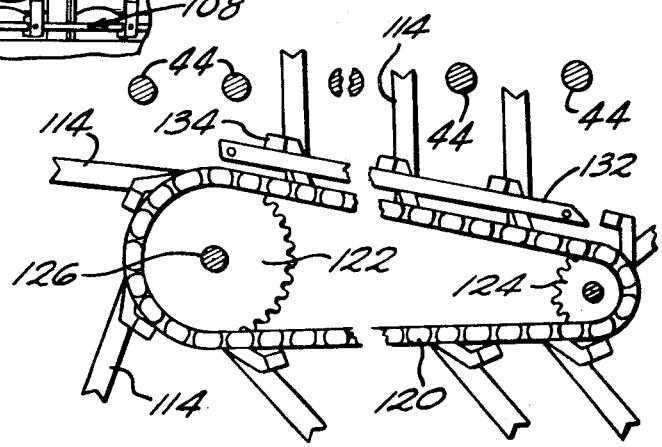
FIG. 19 is a fragmentary sectional view taken along the lines IXX—IXX of FIG. 18.

The results are best seen in FIG. 16, wherein the row of eggs which is just moving into the station is identified by the numeral 108. By the time a row moves to the position identified by the number 110 the eggs have moved to a position close to or touching one or the other of the fencing strips 150 forming the column in which the egg is in, and in each case the pointed end is the end so adjacent to the fencing strip.

Because the pointed end is adjacent the fencing strip at this point in the eggs' progress through station A, it is possible at this point to raise the larger end of the egg so as to orient the pointed end downwardly. To accomplish this, movable flexible fingers 114 (FIG. 10) are moved upwardly between the rollers at a point approximating the midpoint of the column defined by the fencing strips 150. The fingers first pass upwardly through the plane defined by the rollers 44, so as to engage the row of eggs occupying the position shown as row 115 in FIG. 16. It will be readily seen that the eggs at that point have been upended due to the engagement of each egg with a finger 114. The fingers continue to move in sequence with the rollers to the point where station A terminates as measured by support bar 116 which serves to hold the fencing strips in position, the fingers at that point being withdrawn.

Figure 21:
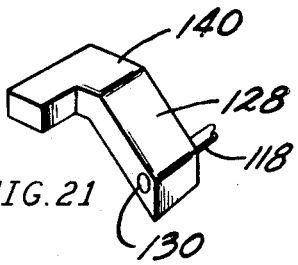
FIG. 21 is a perspective view of the cam illustrated in FIG. 19.
Figure 18:
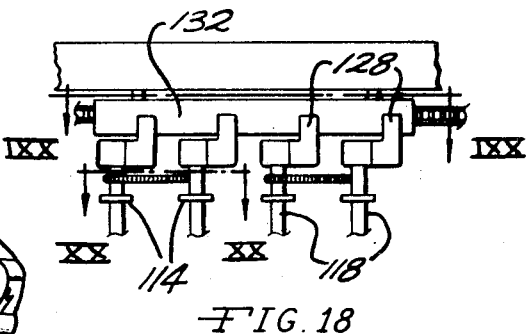
FIG. 18 is an enlargement of a portion of FIG. 17.

The mechanism for so orienting and moving the fingers in sequence with the rollers is shown in FIGS. 17 through 21. The fingers 114 are mounted on bars 118 which in turn are attached to two endless chains 120 which are driven by sprockets 122 and 124. The sprocket 122 is mounted on a shaft 126 which is in turn driven by a sprocket 128 engaged by a chain 130, the latter of which is driven from a sprocket attached to an extension of shaft 50. At one end of each of the shafts 118, there is interposed a cam follower 128 in between the end of the rod 118 and the chain 120. The cam follower 128 shown in detail in FIG. 21 is mounted upon an extension of the rod or bar 118 extending through an opening 230. To orient the fingers 114 in the correct vertical position so that they do not touch the rollers 44 and to raise them into engagement with the eggs, a camming surface 132 is mounted to the frame of the machine to engage and guide the cam follower 128. Also, each pair of adjacent rods 118 is connected by a spring 136 (FIG. 20) in such a way as to urge the rod 118 to rotate so that the cam follower 128 presses against the cam surface 132. That is, the spring 136 is mounted (FIG. 20) so that it passes under the lead rod 118 of the pair and over the following rod 118, the spring being attached firmly to the rod by means such as a pin 138. To allow for the fact that the cam follower 128 must ride up over the camming surface 132 which is positioned above the chain 120, the cam 128 has a bend 140 therein. It will be seen by this construction that the chain 120 gives the bars 118 a forward speed which is the same as the forward speed of the rollers 44 driven by the chains 46. The camming surface 132 not only holds the fingers 114 in the vertical position as caused by the action of the spring 136, but also the camming surface serves to raise the fingers through the plane of the rollers 44 so as to upend the eggs in the columns formed by the strips 150. When the chain 120 moves forward over the edge of the sprocket 122, the fingers 114 are whipped out of engagement between the rollers 44 and carried under the plane of the rollers 44 to the point where they are again brought into position between the rollers at the midpoint of station A.

The flexible fingers 114 can be made of thin metal or plastic, provided that they are stiff enough to insure that they will force the eggs to upend.

It will be apparent that the upending mechanism described above could be modified so as to achieve the same results with an equivalent structure. For example, the drive of the chain 120 could be accomplished by driving the sprocket 124 rather than the sprocket 122. Also, there is nothing critical about the shape of the cam 128, provided the cooperation between it and the camming surface 132 is such as to maintain the fingers 114 in a vertical position spaced between the rollers 44. Furthermore, the fingers 114 need not engage the eggs exactly at the midpoint of station A, provided wherever the engagement occurs the eggs have moved so that the fingers push up the large end.

As a safeguard against the piling up of eggs in the columns in station A, which pileup would prevent the proper functioning of the machine at later stations, levers 142 are positioned above and over the columns of eggs in station A, the levers being attached to a common shaft 146 which in turn utilizes an arm 148 to depress a microswitch (FIG. 9). As long as the arm 148 depresses the switch, the machine continues to function. But should a pileup cause one of the levers to rise up, the switch is opened, thereby opening the circuit to the motor so as to stop the machine.

STATION B

To insure that the eggs remain upended with the pointed end down when they move into station B where the fingers 114 no longer are engaged with the egg, the fencing strips 150 begin to converge so as to narrow the width of the columns in which the eggs are confined. That is, up to the position defined by row 115, the fencing strip 150 comprises two joined metal sections 152 and 154 (FIG. 10). At the point of the row 113, the composite metal fencing strip splits so as to cause the sides of the columns formed by the single sections 152 and 154 to converge at the end of the station A. The diverging sections 152 and 154 forming the converging side of the columns are held in place by the bar 116. In station B, the sections 152 and 154 again converge upon each other to reform the composite fencing strips 150, because the converging columns are maintained by bringing the columns themselves closer to one another. However, even though the fencing strips 150 defining the sides of the column are converging in station B, the width of the column has not reached the point where it approximates the width of an egg, so that it is still possible because of the gap formed by the rollers 44 for an egg to tip over in its column in station B. To prevent this, a plurality of star wheels 158 are rotatably mounted on one of the pair of fencing strips 150 defining each column. To provide an egg resting surface projecting down between the rollers 44, the star wheel is provided with five fingers or points 160. Because the star wheel 158 is rotatably mounted and fixed in its position relative to the rollers 44, when a row of eggs advances the rollers defining that row force the point 160 projects down between the rollers to rotate out of the way and the following point or finger 160 takes up its position between the next two adjacent rollers forming the next row occupying that position. The star wheels are thus able to maintain the eggs in up-ended orientation the length of station B, which station ends at the reinforcing bar 164, the bar 164 being primarily to support the fencing strips 150 in their converging relationships.

STATION C

To allow the eggs to be picked up in their proper orientation for insertion in an egg carton, station C is located with the fencing strips 150 so positioned that the width of the column approximates the width of an egg and so that each egg is spaced apart in its row the distance the egg is to be spaced apart in the carton. For this purpose each fencing strip 150 is maintained in its composite joined state, the rejoining of the two sections 152 and 154 having occurred near the end of station B (FIG. 1). To hold the eggs vertical and yet allow for a variation in the width of eggs coming into the machine, the fencing strips in station C include flexible spacing means. Specifically, these spacing means incorporate horizontally extending wire loops 170 joined to the sides of each of the fencing strips on both sides of the column. Because of the flexibility of the loops, all the eggs including an unusually wide egg can pass through the column and still be held upright, the loop being compressed for this purpose.

Because the apparatus orients the eggs with the pointed end downward, it is possible to utilize a conventional vacuum lifting head 200 in the removal of the eggs from the station C to an egg carton. Such a vacuum lift head comprises a plurality of bars 202 having nipples depending therefrom to which are attached flexible cups 204 which grip the egg when the vacuum is applied. The vacuum lift head can be operated by hand or it can be mounted on a machine for automatic operation. The vacuum lift head has the advantage of avoiding the use of a clamp, thereby insuring that the eggs are less likely to break.

CONTROLS

The actuation of the various parts described above is accomplished as follows:

A motor 210 continuously drives a sprocket 212 which engages a chain 214 driving in turn another sprocket 216. The sprocket 216 is mounted on a drive shaft 218, which shaft projects through the entire width of the machine. Mounted on the shaft 218 is a second sprocket which drives via a chain 220 an additional sprocket 222 which is utilized to drive the accumulating table. On the other side of the machine, a ratchet wheel 224 is fixed to the end of the shaft 218. To periodically engage the ratchet wheel 224, a pawl 226 is pivotally mounted on a disc 228 which freely rotates with respect to the shaft 218. In its inoperative position, the disc 218 is held in position by a detent 230 engaged by a spring-biased lever 232. To periodically cause the advancement of the rollers 44 by rotating the drive shaft 50, a throw arm 234 eccentrically mounted on the disc 228 is threaded to a rod 236 the other end of which engages a lever 238. Mounted on the lever 238 is a pawl 240 which in turn engages another ratchet wheel 242 mounted on the drive shaft 50. To complete the engagement of the disc 228 with the constantly rotating shaft 218, the solenoid 72 causes the pawl 226 which is spring-biased normally out of engagement with the ratchet wheel 224 to engage the ratchet, thereby causing the disc 228 to rotate until the pawl 226 is disengaged by means of the disengagement of the solenoid 72 caused by the vacuum switch 70. As the disc 228 rotates, the arm 236 causes the ratchet wheel 242 to rotate, thereby advancing a row of eggs one row at a time. To operate the raising of the gate 74 in sequence with the indexing of the rollers 44, still another sprocket (not shown) is mounted on the drive shaft 218 inside of the disc 228, the sprocket engaging a chain 250 which in turn engages a freely rotating sprocket 252 mounted on the frame of the machine. To engage the cam follower 90, a cam 254 is fixed to the sprocket 252 (FIG. 22).

Certain obvious modifications providing the equivalent function will be readily apparent to one skilled in the art. For example, the star wheel utilized in station B need not be five-pointed, but for example could be four-pointed provided the spacing of the points is such that it prevents the eggs from tipping over between the rollers 44 and will allow the star wheel to rotate so that as each row advances the following fingers of the star wheel engage between the following rollers defining the next row of eggs.

The embodiments of the invention in which an exclusive property or privilege is claimed are defined as follows.

1. In an egg-packing machine comprising means for forming columns of eggs, means for advancing said columns one row at a time, means for orienting the eggs within said rows in a prescribed position, the improvement comprising including in said orienting means and said advancing means a plurality of rollers, each adjacent pair of which defines one of said rows; means for rotating said rollers while they are advancing; and means positioned between said column forming means and said rollers for raising the larger end of the eggs held therein, said raising means being constrained to move with said rollers.

2. The improved egg-packing machine as defined in claim 1, wherein said advancing means includes a chain to which said rollers are rotatably mounted.

3. The improved egg-packing machine as defined in claim 1, wherein said rotating means includes a rack fixed relative to said rollers, and said rollers each have a pinion gear mounted at an end thereof for engagement with said rack.

4. The improved egg-packing machine as defined in claim 1, wherein said column forming means includes fencing strips separating the eggs into columns, said strips being positioned so they gradually approach one another to a width approximating the width of an egg.

5. The improved egg-packing machine as defined in claim 4, wherein said raising means includes flexible fingers projecting upwardly, said fingers being positioned approximately equidistant between said strips prior to the point where the latter are spaced approximately an egg's width apart, so as to cause an egg moving between said strips to be upended by said fingers.

6. The improved egg-packing machine as defined in claim 4, and further including in said orienting means as an improvement thereof, means for maintaining the eggs with the pointed end down as they move through said columns.

7. The improved egg-packing machine as defined in claim 6, wherein said maintaining means includes fingers rotatably mounted on one of each pair of strips defining a column, said fingers projecting down between said rollers so that the advancement of the rollers cause one finger temporarily in projecting position to rotate out of the way and another finger to rotate into the projecting position.

8. The improved egg-packing machine as defined in claim 7, wherein rotatably mounted fingers occupy a position prior to said egg's width spaced-apart point; and further comprise a five-pointed star wheel, each point comprising one of said rotatably mounted fingers.

9. The improved egg-packing machine as defined in claim 4, wherein said strips include, at said egg's width spaced-apart point, flexible spacing means for accommodating eggs which vary in size.

10. The improved egg-packing machine as defined in claim 9, wherein said spacing means includes on both both sides of each of said strips, wire loops projecting out into said columns.

11. The improved egg-packing machine as defined in claim 1, and further including means positioned above said columns in the vicinity of said rotating means for detecting any pileup of eggs on each other in any of said columns and for shutting down the machine in that event.

12. The improved egg-packing machine as defined in claim 11, wherein said detecting means includes levers which ride out over said columns, said levers being operatively connected to a microswitch which is closed unless any of said levers is forced upward.